Aug. 11, 1925.
E. H. REMDE
1,549,029
INDUSTRIAL TRUCK
Filed Jan. 9, 1923
3 Sheets-Sheet 1
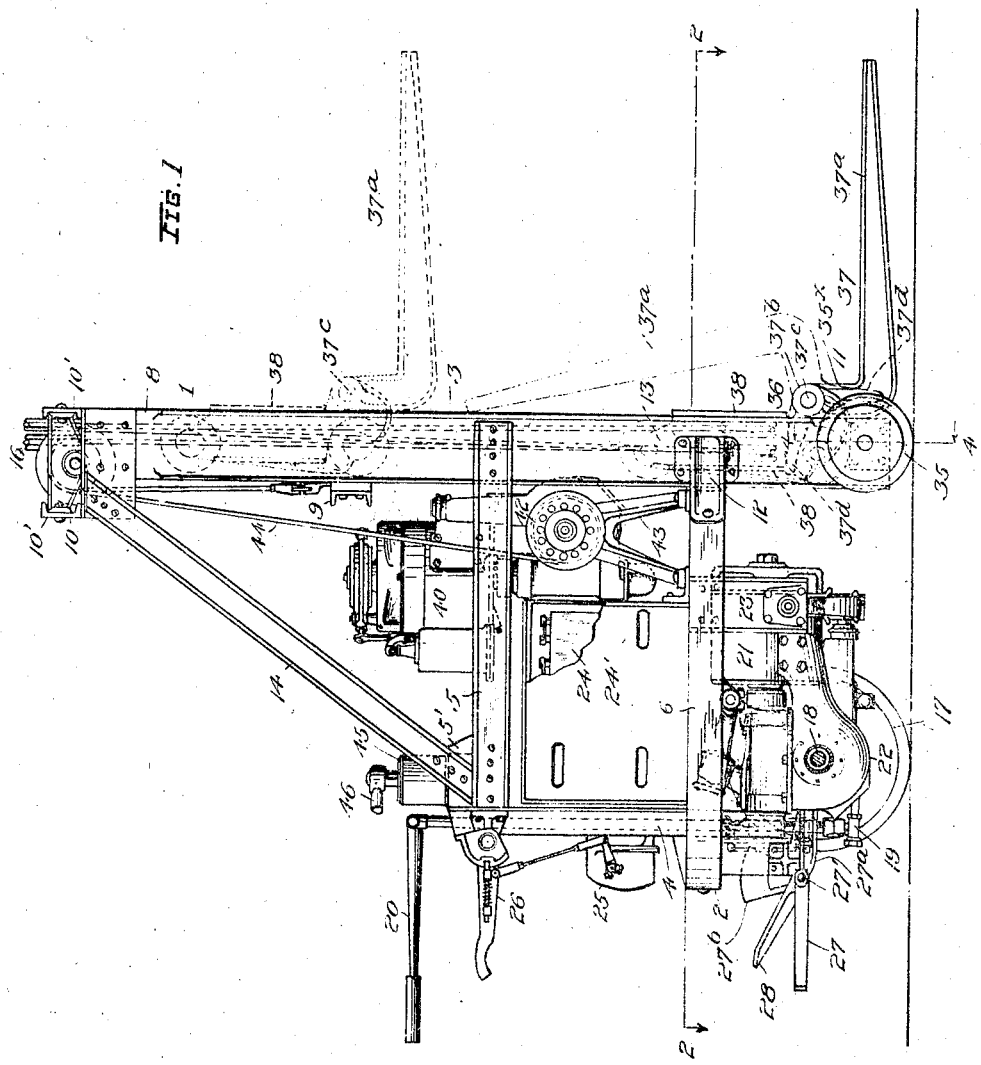
Inventor
Edward H. Remde
By Edward R. Alexander
Attorney Aug. 11, 1925.
E. H. REMDE
INDUSTRIAL TRUCK
Filed Jan. 9, 1923
1,549,029
3 Sheets-Sheet 2
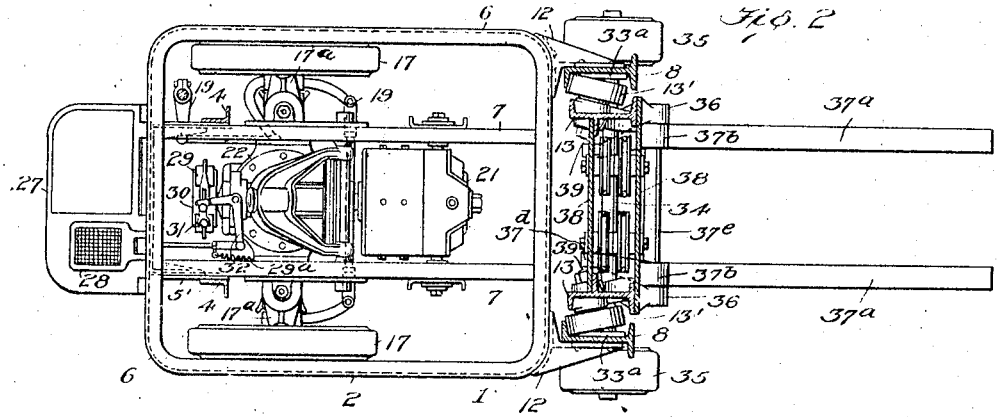
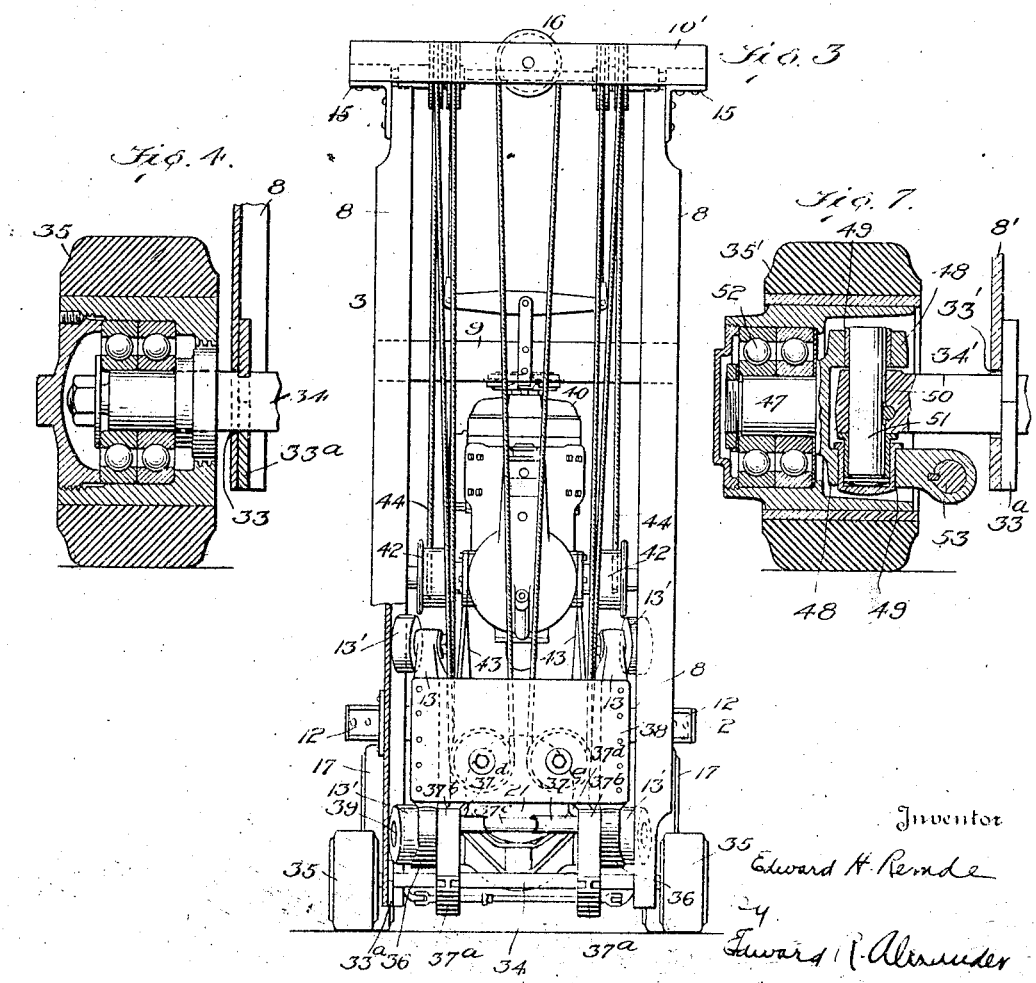
Inventor
Edward H. Remde
By
Edward J. Alexander
Attorney Aug. 11, 1925.

E. H. REMDE 1,549,029

INDUSTRIAL TRUCK

Filed Jan. 9, 1923    3 Sheets-Sheet 3

By Edward H. Remde
Edward R. Alexander
Attorney

Patented Aug. 11, 1925.

1,549,029

UNITED STATES PATENT OFFICE.

EDWARD H. REMDE, OF CLEVELAND, OHIO, ASSIGNOR TO THE BAKER R. & L. COMPANY, OF CLEVELAND, OHIO, A CORPORATION OF OHIO.

INDUSTRIAL TRUCK.

Application filed January 9, 1923. Serial No. 611,611.

*To all whom it may concern:*

Be it known that I, EDWARD H. REMDE, a citizen of the United States, residing at Cleveland, in the county of Cuyahoga and State of Ohio, have invented certain new and useful Improvements in and Relating to Industrial Trucks, of which the following is a specification.

This invention relates to an industrial truck, more particularly a truck adapted for elevating, lowering, transporting and stacking or tiering goods, boxes, crates and other bodies.

One object of the invention is to provide a truck of this character that is relatively simple in construction and economical to manufacture.

Another object of the invention is to provide an improved truck of this character capable of (1) operating in a minimum area and (2) stacking a greater quantity of goods in any given space.

Another object of the invention is to provide an improved construction of truck in which the supporting or trailing wheels are arranged relative near to the center of gravity of the load to be transported or moved vertically, while permitting the elevating member of the truck to readily engage and disengage the goods in carrying out its operations of transporting and elevating or lowering them.

A further object of the invention is to provide an improved truck capable of engaging goods or bodies mounted on low skids or relatively small supporting blocks to stack them in tiers or piles of relatively great height or to disassemble them from such arrangement, without the exercise of manual labor.

Another object of the invention is to provide an improved truck of this character capable of engaging and transporting loads mounted on relatively narrow and low types of skids, while maintaining stability during operation.

Other objects of the invention will be apparent to those skilled in the art to which my invention relates from the following description taken in connection with the accompanying drawings, wherein—

Fig. 1 is a side elevation of a truck embodying my invention, partly in section.

Fig. 2 is a section on the line 2—2 of Fig. 1.

Fig. 3 is an end elevation looking at the right hand end of Fig. 1.

Fig. 4 is a section on the line 4—4 of Fig. 1.

Fig. 7 is a section on the line 7—7 of Fig. 6.

Figure 5:
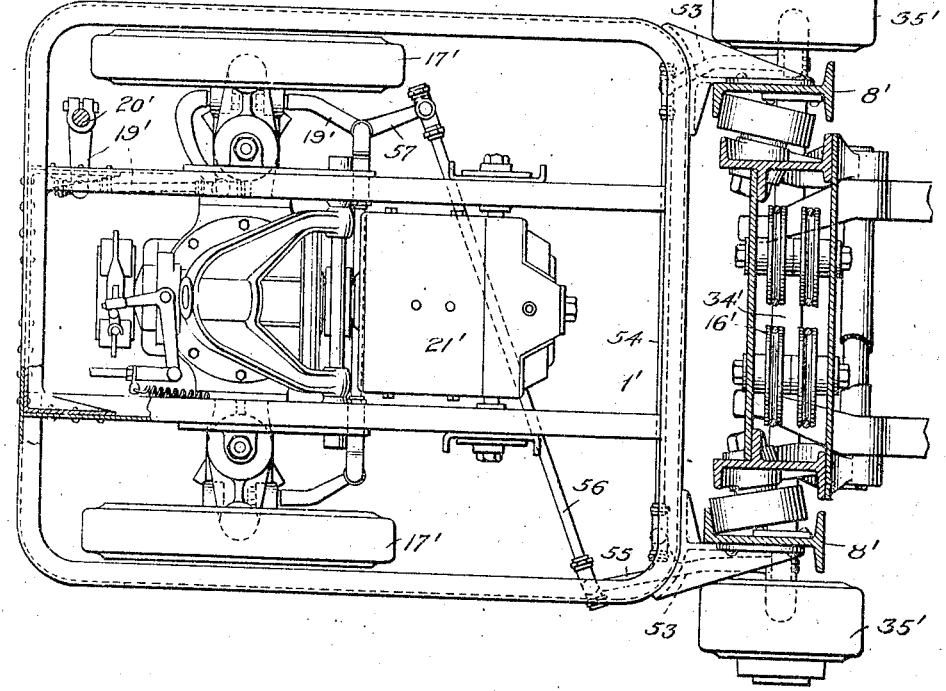
Figs. 5 and 6 are sectional and fragmentary side elevational views, respectively, of a truck embodying a slightly modified form of construction.

In the drawings, 1 indicates as an entirety a frame preferably comprising a main section 2, a vertically arranged guide section 3 rigidly connected to one end of the frame section 2, a pair of uprights 4 arranged at or near the opposite end of the main frame section 2 and a pair of bars 5 connecting the upper ends of the uprights 4 to the guide frame section 3. The main frame section 2 may consist of a pair of U-shaped channel members 6, having their free ends abutting and connected in any desired manner and a pair of longitudinally extending channel bars 7 spaced from each other and the sides of the members 6, as shown in Fig. 2. The U-shaped channel members 6 and channel bars 7, constituting the main frame section 2, may be constructed and connected together as shown and claimed in my co-pending application Serial No. 425,555, filed November 20, 1920, if desired. The guide frame section 3 preferably comprises a pair of channel or I-beams 8, rigidly maintained in spaced, parallel relation by a cross member 9 arranged intermediate their ends, a sill 10 disposed at the upper ends of the beams 8 and connections with the main frame section 2 of the construction later to be described. The guide frame section 3 extends below the main section 2 to a point adjacent the ground or floor and thereabove to provide sufficient vertical movement for an elevating member or platform, indicated as an entirety 11, to adapt the truck to varying uses and applications in transporting and tiering, or loading and unloading goods, boxes, crates and other bodies. The guide frame section 3 is preferably connected to the main frame section 2 by a pair of brackets 12, each riveted at its opposite ends to the frame section 2 and the adjacent channel or I-beam 8. As shown in the drawings, the channel or I-beams 8 constituting the guide frame section 3 oppose each other so that the side walls thereof may serve as guides for shoes 13, which are supported between the beams 8 and form a part of the elevating member or platform 11.

14 indicates a pair of tie rods or bars extending between and connected at their opposite ends to the outer ends of the bars 5, or angle plates 5' secured thereto, and the sill 10, and serving to brace the guide frame section 3 against movement relative to the main frame section 2, due to the weight of the load which at any time may be supported on the elevating member 11. As already set forth, the ends of the bars 5 remote from the uprights 4 are connected in a well known way to the channel or I-beams 8 and assist in maintaining the main section 2 and guide frame section 3 in rigid relationship. The sill 10 preferably comprises a pair of channel bars 10', 10', supported upon and secured to a pair of brackets 15, each of which is secured to the outer side of one of the I-beams 8 in a well known manner. The sill 10 serves to support certain elements of a hoisting or elevating mechanism 16, to which reference will later be made.

17 indicates a pair of wheels disposed below and preferably within the sides of the main frame section 2. The wheels 17 are preferably pivotally supported, by means of suitable knuckles 17ª, upon an axle 18, whereby they may be turned for steering purposes, the spindles of the wheels 17 being connected in any desired manner to a steering gear 19, which in turn is connected to and is operated by a suitable handle 20. The wheels 17 are arranged to be driven by a motor 21, preferably of the electric type. The motor 21 is connected to a driving mechanism, which in turn is operatively connected to the wheel spindles for driving the latter. The driving mechanism is enclosed in a suitable housing, indicated as an entirety at 22, to which the motor casing may be connected so that the housing and motor may be supported as a unit by a suspension mechanism indicated as an entirety at 23. The suspension mechanism 23 herein illustrated forms the subject-matter of and is claimed in a co-pending application filed by John H. Hertner and myself, Serial No. 420,630, filed October 30, 1920, to which reference may be made for a further description thereof. 24 indicates a suitable battery or batteries removably supported on the main frame section 2 and arranged to supply current to the motor 21. The batteries 24 may be enclosed in a suitable casing 24'. 25 indicates a controller interposed in and controlling the circuit for the motor 21 in a well known manner, the controller being actuated by a suitable lever 26. 27 indicates a step or base on which the operative stands when operating the truck, the steering lever 20 and the controller handle 26 being arranged within convenient reach for this purpose. The step or base 27 is preferably pivoted upon a transverse shaft 27' supported at its opposite ends in a pair of brackets 27ª, which are preferably secured to the lower ends of the uprights 4. The shaft 27' has fixed to it a weight 27ᵇ, which acts therethrough to swing the step or base upwardly to an out-of-the-way position, when the operative leaves the step or base. 28 indicates a foot pedal for controlling the brake or brakes 29 for the truck, one thereof being shown in Fig. 2. The brake 29 may comprise a band wheel 30 secured to the free end of the propeller shaft of the driving mechanism, (the shaft extending through the housing 22 for this purpose), and a brake band 31 arranged to engage with the wheel 30. One end of the brake band 31 is connected to a bell-crank 32, which in turn is connected with the foot pedal 28 through suitable operating connections so arranged that the brake will be released when the foot pedal is depressed. One element of the connections has connected to it a spring 29ª, which normally operates to apply the brake band 31 to the wheel 30 whenever the foot pedal is released or allowed to swing upwardly.

33 indicates openings formed in the beams 8 near their lower ends and preferably forward of the longitudinal center line thereof. 34 indicates an axle which extends through the openings 33, its opposite ends extending beyond the beams 8 and carrying thereon trailing or supporting wheels 35, which cooperate with the wheels 17 to support the frame 1. The walls of the openings 33 are preferably reinforced by plates 33ª. Where the axle is round, one side wall of the opening through the plate 33ª may be arranged to engage a squared portion of the axle to lock it against turning. The plates 33ª are made in sections to permit assembly thereof. The trailing or supporting wheels 35 are preferably relatively small in diameter to provide for relatively great carrying capacity. By preference, suitable anti-friction bearings are arranged between the axle 34 and the hub of each wheel 35. By the arrangement herein described, it will be seen that the wheels 35 are disposed below the guide frame 3 so as to substantially directly carry the load on the elevating member 11. The wheels 35 being relatively near to the center of gravity of the load on the elevating member, they permit relatively heavy loads to be carried and transported without increasing the size and strength of the truck frame.

As the guide frame 3 is arranged on the end of the main frame 2 and the trailing wheels are mounted upon and support the lower ends of the guide beams 8, I am enabled to secure a number of advantages, to-wit, the main frame 2 is supported at suitable height to provide for a motor of suitable size and relative large traction wheels; the frame has a relatively short wheel base while providing for the elevation of loads to great heights without affecting the stability of the truck; as the frame does not project beyond the guide beams, the elevating member, particularly the platform member thereof, can be (1) made relatively narrow for engagement with relatively small skids, and (2) moved to a point adjacent the ground and thus engage low skids and loads positioned on supporting blocks or bars; the capability of the truck to engage and transport loads and to raise or lower them, under different or varying conditions is increased, while at the same time its construction is materially simplified and its weight reduced.

The construction of the frame also permits the trailing or supporting wheels 35 to be arranged outside of the beams 8, thereby leaving the space between the beams unobstructed and spacing the wheels far apart in the transverse plane of the guide frame to impart relatively great stability thereto. As shown, the wheels 35 are arranged outside the longitudinal planes in which the traction wheels are disposed.

The elevating member or platform 11 comprises a shoe element 36 and a platform element 37 connected thereto. The shoe element 36 preferably comprises a pair of shoes 13, already referred to, connected together by a pair of spaced plates 38 and upper and lower shoe devices 13′, each carried by one of the shoes 13 and engaging the inner opposing side walls of the adjacent beam 8. Each shoe device 13′ consists of a roller loosely mounted on a stud shaft 39 supported in the wall of the adjacent shoe 13. The shafts 39 are inclined so that the surfaces of the rollers may engage the inclined inner surfaces of the side walls of the adjacent beam 8 and roll thereon with minimum friction. As will be understood from Figs. 2 and 3, the stud shafts 39 carried by each shoe 13 are inclined at an angle relative to each other and are offset relative to the central longitudinal plane of the adjacent beam 8 so that the lower roller will engage the rear wall of the beam and the upper roller will engage its front side wall. The platform element 37 preferably comprises a pair of spaced arms 37ᵃ extending laterally relative to the shoe element 36, and, if desired, they may carry a suitable plate or table (not shown). Each of the arms 37ᵃ is provided with (1) a hinge element 37ᵇ correlated with a hinge element at the lower end of the shoe element and connected thereto by a suitable pivot pin 37ᶜ, this construction permitting the platform to swing upwardly to the position shown in dotted lines in Fig. 1, and (2) a tail device 37ᵈ, which extends rearwardly for engagement with the lower edge of the inner plate 38 when the arm 37ᵃ is moved to the horizontal position, the plate serving to limit the downward movement of the arm and to support it horizontally for loading, carrying and load raising or lowering purposes. When the arms are swung upwardly, it will be seen that the length of the truck is relatively short, thus permitting it to be moved into and around restricted areas and stored in a relatively small space. The arms 37ᵃ are maintained in spaced relation and against the inner sides of the hinge elements 37ᵇ by a sleeve 37ᵉ fitting the pivot pin 37ᶜ.

It will be noted that the arms constituting the platform elements are bent upwardly at their inner ends, at substantially right angles, as shown at 35ˣ. This construction permits the arms to be positioned in a plane below their connections with the shoe elements, thereby providing for movement of the arms to a position relatively close to the ground or floor without danger of the elevating member 11 engaging with the axle for the supporting wheels 35 or other elements associated therewith.

The hoisting and elevating mechanism 16 is connected to the elevating member and serves to raise the latter from the position shown in Fig. 1 to the desired elevation within the limits of the guide beams 8, and to lower the same. The operating means for the hoisting and elevating mechanism preferably include an electric motor 40 and winding drums 42 driven thereby. The motor and drums are mounted on standards 43 which are fixed upon the main frame section 2, preferably near its rear end, between the battery casing 24′ and the guide frame 3. The drums 42 have connected to them flexible members 44, such as cables—which are operatively connected to the elevating member or platform. As I have herein shown a hoisting and elevating mechanism the elements of which are similar to and co-operate like corresponding elements in my co-pending application, Serial No. 592,138, filed October 3, 1922, and to which reference may be made, it is thought that further description herein will not be necessary.

45 indicates a controller interposed in and controlling the circuit from the batteries 24 to the motor 40. The controller 45 is provided with an operating handle 46. As shown, the controller 45 is arranged so that its handle may be in position to be operated by operative while standing on the step or base 27.

Figure 6:
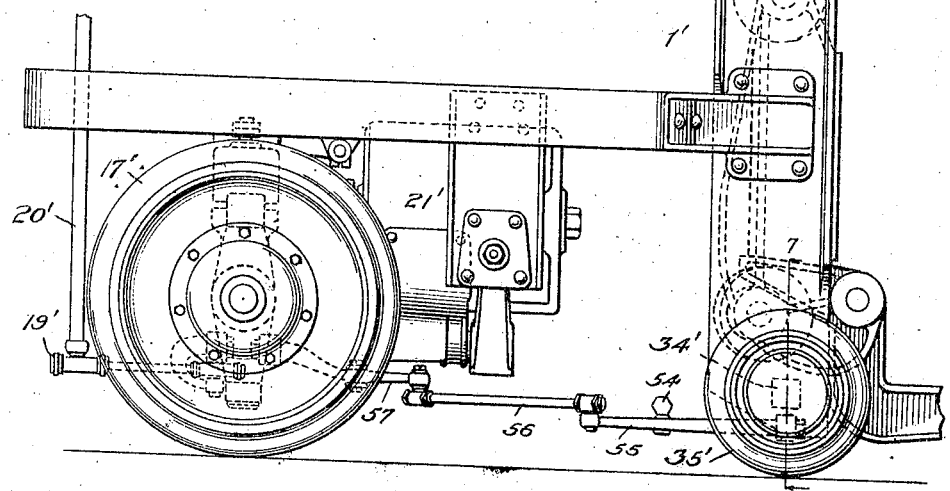

In Figs. 5, 6 and 7 I have shown a slightly modified form of construction, wherein the trailing wheels for the truck frame are pivotally mounted and (by preference) connected to the steering gear for the traction wheels so as to co-operate with the latter in steering the truck. Referring to these views, 1' indicates the truck frame. 17' indicates the traction wheels, pivotally mounted to swing about vertical axes for steering purposes. 19' indicates the steering gear for the wheels 17'. 20' indicates the steering post for operating the steering gear 19'. 21' indicates the motor for driving the wheels 17', in the manner already set forth. 16' indicates the hoisting or elevating mechanism. 34' indicates an axle the opposite ends of which extend through openings 33' formed in the lower ends of the guide frame beam 8', to the outer sides thereof. The walls of the openings 33' are preferably reinforced by plates 33ª. 35' indicates the trailing wheels, each mounted on a spindle 47. The spindle 47 for each wheel is provided at its inner end with a pair of spaced knuckles 48, the openings 49 through which are arranged to align with an opening 50 formed in the free end of the axle 34' to receive a pivot pin 51. 52 indicates suitable anti-friction bearings arranged between each spindle 47 and the hub of the adjacent wheel 35'. The mounting and bearing devices between the axle 34' and knuckles 48 and the pivot pin 51 may be similar to corresponding parts shown and claimed in my co-pending application Serial No. 601,098, filed November 15, 1922. One of the knuckles 48 of each spindle 47, preferably the lower one is provided with an arm 53, which is pivotally connected with the arm 53 of the lower knuckle for the other spindle by a tie rod 54. 55 indicates an extension provided on one of the arms 53. The outer end of the extension is connected by a rod 56 with an extension 57 provided on one of the elements constituting the steering gear 19' for the traction wheels 17'. The extensions 55 and 57 are preferably connected with the wheel spindles at opposite sides of the truck in order to simplify the construction.

Where the trailing wheels are mounted to swing about vertical axes, it will be seen that the truck is capable of turning about relatively sharp corners and movement in relatively small or restricted spaces, thereby facilitating its rapid operation and range of adaptation to varying conditions in connection with the tiering and transporting of goods.

To those skilled in the art to which my invention relates, many modifications and alterations in construction and widely differing embodiments and applications of the invention will suggest themselves without departing from its spirit and scope. The disclosures and the description herein are purely illustrative and are not intended to be in any sense limiting.

What I claim is:

1. In apparatus of the class described, the combination of a main frame, a vertically arranged guide frame rigidly connected to one end of the main frame and extending to points therebelow and thereabove, two pairs of wheels co-operating to support said frames, one of said pairs of wheels being disposed at that end of the main frame remote from said guide frame and the other pair of wheels being disposed on the outer sides of said guide frame and connected thereto, and a platform member extending laterally from and guided by said guide frame to move vertically substantially from end to end thereof.

2. In apparatus of the class described, the combination of a main frame, a vertically arranged guide frame rigidly connected to one end of the main frame and extending to points therebelow and thereabove, two pairs of wheels co-operating to support said frames, one of said pairs of wheels being disposed at that end of the main frame remote from said guide frame, an axle carried by the lower end of said guide frame and extending beyond the opposite sides thereof, and carrying at its opposite ends the other pair of wheels, and a platform member extending laterally from and guided by said guide frame to move vertically substantially from end to end thereof.

3. In a truck construction, the combination of a frame comprising a main section and a vertical guide section connected to one end of said main section and extending therebelow and thereabove, two pairs of wheels only cooperating to support said frame, one pair of wheels being relatively small and disposed at the opposite outer sides of said guide section and connected thereto and the other pair of wheels being relatively large and disposed below the opposite end of said main section, means for driving the relatively large pair of wheels, an elevating member guided by said guide section to move vertically, and an elevating mechanism on said frame connected to said elevating member.

4. In a truck construction, the combination of a frame comprising a main section and a vertical guide section connected to one end of said main section and extending therebelow and thereabove, two pairs of wheels only cooperating to support said frame, one pair of wheels being relatively large and disposed adjacent the opposite end of said main section and the other pair of wheels being relatively small and disposed at the opposite outer sides of said guide section and connected to the lower end thereof and spaced apart greater than said relatively large wheels, means for driving said relatively large pair of wheels, an elevating member guided by said guide section, and an elevating mechanism on said frame connected to said elevating member.

5. In a truck construction, the combination of a frame comprising a main section and a pair of spaced vertical guide members connected to one end of said main section and extending therebelow and thereabove, two pairs of wheels only co-operating to support said frame, one pair of wheels being relatively large and disposed adjacent the opposite end of said main section and the other pair of wheels being relatively small and disposed at the opposite outer sides of said guide members and spaced apart greater than said relatively large wheels and connected to said guide members at points to one side of a plane cutting the central longitudinal axes of said guide members, means for driving said relatively large pair of wheels, an elevating member guided by said guide frame, and an elevating mechanism on said frame connected to said elevating member.

6. In a truck construction, the combination of a frame comprising a main section and a pair of spaced vertical guide members connected to one end of said main section and extending therebelow and thereabove, a platform extending laterally from said guide members and movably supported thereby, two pairs of wheels co-operating to support said frame, one pair of wheels being relatively large and disposed adjacent the opposite end of said main section and the other pair of wheels being relatively small and disposed at the opposite outer sides of said guide members in planes beyond the longitudinal planes of said relatively large wheels and connected to said guide members at points adjacent the front guide walls thereof to carry the load supported thereby, and means for driving said relatively large pair of wheels.

7. In a truck construction, the combination of a frame comprising a main section and a pair of spaced vertical guide members connected to one end of said main section and extending therebelow and thereabove, a platform extending laterally from said guide members and movably supported thereby, two pairs of wheels co-operating to support said frame, one pair of wheels being relatively large and disposed adjacent the opposite end of said main section and the other pair of wheels being relatively small and disposed at the opposite outer sides of said guide members in planes beyond the longitudinal planes of said relatively large wheels and each pivotally connected to the adjacent guide member near its lower end to carry the load supported thereby, means for driving said relatively large pair of wheels, and means for steering said relatively small wheels.

8. In a truck construction, the combination of a frame comprising a main section and a pair of vertical guide members connected to one end of said main section and extending therebelow and thereabove, a platform extending laterally from said guide members and movably supported thereby, two pairs of wheels co-operating to support said frame, one pair of wheels being relatively large and disposed adjacent and pivotally connected to the opposite end of said main section and the other pair of wheels being relatively small and disposed at the opposite outer sides of said guide members in planes outside the longitudinal planes of said relatively large wheels and each pivotally connected to the adjacent guide member near its lower end to carry the load supported thereby, means for driving said pair of relatively large wheels, and means for steering said pairs of wheels simultaneously.

9. In a truck construction, the combination of a frame comprising a main section and a pair of vertical guide members connected to one end of said main section and extending therebelow and thereabove, a platform extending laterally from said guide members and movably supported thereby, an axle connected to the lower ends of said guide members having pivoted spindles at their outer ends, two pairs of wheels co-operating to support said frame, one pair of wheels being relatively large and disposed adjacent to the opposite end of said main section and the other pair of wheels being relatively small and mounted on said spindles at the opposite outer sides of said guide members in planes outside the longitudinal planes of said relatively large wheels, means for driving said pair of relatively large wheels, and means for steering said pair of relatively small wheels.

10. In a truck construction, the combination of a main frame, a guide frame connected to one end of said main frame and extending thereabove and therebelow, two pairs of pivotally mounted wheels co-operative to support said frames, one pair being arranged at the opposite end of said main frame and connected thereto and the other pair being arranged on the outer sides of and connected to the lower end of said guide frame, means for driving one of said pairs of wheels, and steering connections between said pairs of wheels, whereby they may be simultaneously steered.

11. In apparatus of the class described, the combination of a horizontal frame, a pair of traction wheels at one end thereof, pairs of uprights connected to the opposite ends of said frame and extending vertically relative thereto; a pair of horizontal bars connected at their opposite ends to said uprights, one pair of uprights comprising guides, a member mounted to slide in said guides, a pair of trailing wheels connected to the lower ends of said guides and co-operating with said traction wheels to support the opposite ends of said frame, and means for operating said member.

12. An apparatus as claimed in claim 11, in which the operating means for said member are mounted on said frame adjacent said guides.

In testimony whereof I hereunto affix my signature.

EDWARD H. REMDE.